(12) United States Patent
Marutani

(10) Patent No.: US 11,108,113 B2
(45) Date of Patent: Aug. 31, 2021

(54) BATTERY CASE, BATTERY CELL, BATTERY MODULE, AND BATTERY MODULE MANUFACTURING METHOD

(71) Applicant: Mitsubishi Electric Corporation, Chiyoda-ku (JP)

(72) Inventor: Kentaro Marutani, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 70 days.

(21) Appl. No.: 16/311,022

(22) PCT Filed: Jul. 7, 2016

(86) PCT No.: PCT/JP2016/070190
§ 371 (c)(1),
(2) Date: Dec. 18, 2018

(87) PCT Pub. No.: WO2018/008135
PCT Pub. Date: Jan. 11, 2018

(65) Prior Publication Data
US 2020/0028130 A1    Jan. 23, 2020

(51) Int. Cl.
*H01M 2/10* (2006.01)
*H01M 10/48* (2006.01)
(Continued)

(52) U.S. Cl.
CPC ....... *H01M 50/209* (2021.01); *H01M 10/482* (2013.01); *H01M 10/0481* (2013.01);
(Continued)

(58) Field of Classification Search
CPC ............. H01M 10/0481; H01M 10/48; H01M 10/482; H01M 2220/20; H01M 2/0207;
(Continued)

(56) References Cited

U.S. PATENT DOCUMENTS 8,309,248 B2    11/2012  Koetting et al.
10,559,430 B2    2/2020  Morita et al.
(Continued)

FOREIGN PATENT DOCUMENTS

EP    2 772 429 A1    9/2014
JP    54-57415 U    4/1979
(Continued)

OTHER PUBLICATIONS

Extended European Search Report dated Jan. 8, 2020, in Patent Application No. 16908179.1, 16 pages.
(Continued)

*Primary Examiner* — Lingwen R Zeng
(74) *Attorney, Agent, or Firm* — Oblon, McClelland, Maier & Neustadt, L.L.P.

(57) ABSTRACT

A battery case accommodates therein a battery cell that has a first main surface and a second main surface opposite the first main surface. The battery case includes a chassis with which the first main surface of the battery cell comes into contact, and a holding plate that comes into partial contact with the second main surface of the battery cell and presses against the battery cell.

12 Claims, 18 Drawing Sheets

(51) Int. Cl.
*H01M 50/209* (2021.01)
*H01M 10/04* (2006.01)
*H01M 50/103* (2021.01)
*H01M 50/10* (2021.01)
*H01M 50/20* (2021.01)

(52) U.S. Cl.
CPC ............ *H01M 10/48* (2013.01); *H01M 50/10* (2021.01); *H01M 50/103* (2021.01); *H01M 50/20* (2021.01); *H01M 2220/20* (2013.01); *Y02E 60/10* (2013.01)

(58) Field of Classification Search
CPC .... H01M 2/0217; H01M 2/10; H01M 2/1061; H01M 2/1077; H01M 50/10; H01M 50/103; H01M 50/20; H01M 50/209; Y02E 60/10
See application file for complete search history.

(56) References Cited

U.S. PATENT DOCUMENTS

| | | | |
|---|---|---|---|
| 2008/0057392 | A1 | 3/2008 | Takamatsu et al. |
| 2009/0029239 | A1 | 1/2009 | Koetting et al. |
| 2011/0236739 | A1 | 9/2011 | Watanabe et al. |
| 2012/0052359 | A1 | 3/2012 | Yoshitake et al. |
| 2013/0224524 | A1 | 8/2013 | Nam et al. |
| 2014/0363720 | A1 | 12/2014 | Ackermann et al. |
| 2017/0323736 | A1 | 11/2017 | Morita et al. |
| 2018/0175338 | A1* | 6/2018 | Osako ............... H01M 10/0481 |

FOREIGN PATENT DOCUMENTS

| | | | |
|---|---|---|---|
| JP | 63-21745 | A | 1/1988 |
| JP | 1-71866 | U | 5/1989 |
| JP | 7-251637 | A | 10/1995 |
| JP | 2004-139934 | A | 5/2004 |
| JP | 3888283 | B2 | 2/2007 |
| JP | 2007-66761 | A | 3/2007 |
| JP | 2008-108651 | A | 5/2008 |
| JP | 2008-184015 | A | 8/2008 |
| JP | 2009-43724 | A | 2/2009 |
| JP | 2014-22058 | A | 2/2014 |
| JP | 2015-22915 | A | 2/2015 |
| JP | 2015-76188 | A | 4/2015 |
| JP | 2016-81762 | A | 5/2016 |
| JP | 2016-100308 | A | 5/2016 |
| WO | WO 2006/059455 | A1 | 6/2006 |
| WO | WO 2016/189745 | A1 | 12/2016 |

OTHER PUBLICATIONS

International Search Report dated Oct. 11, 2016 in PCT/JP2016/070190 filed Jul. 7, 2016.

Partial Supplementary European Search Report dated Jul. 4, 2019, in Patent Application No. 16908179.1, 22 pages.

Indian Office Action dated Aug. 18, 2020 in Patent Application No. 201847048041, 4 pages.

Office Action dated Mar. 25, 2021 in European Application No. 16908179.1.

\* cited by examiner

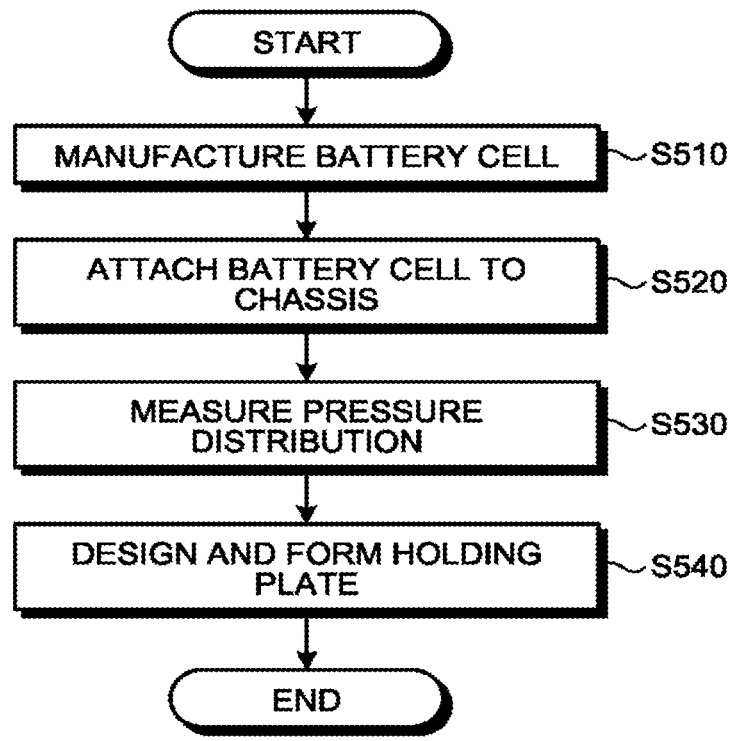

BATTERY CASE, BATTERY CELL, BATTERY MODULE, AND BATTERY MODULE MANUFACTURING METHOD

FIELD

The present invention relates to a battery case that uses a holding plate; a battery cell; a battery module; and a battery module manufacturing method.

BACKGROUND

Conventional batteries are in use that include battery packs in which battery cells are connected to each other and are accommodated in a battery case. Saving weight is a particularly important issue with batteries used in space depending on the required mechanical and environmental conditions.

A battery modularization technology is disclosed in Patent Literature 1. In Patent Literature 1, a method is employed that makes use of the fact that battery cells expand during charging and in which the first main surface, i.e., the back surface, of a battery body is secured to the chassis and a stainless steel holding plate that can be regarded as an elastic body is pressed against the entire second main surface of the battery body so as to secure the battery cell by using a repulsive force against the expansive force.

With the cell mounting method in Patent Literature 1, the stainless steel holding plate having spring-like properties presses against a highly charged cell in response to the expansive force so as to secure the battery cell in place.

CITATION LIST

Patent Literature

Patent Literature 1: Japanese Patent No. 3888283

SUMMARY

Technical Problem

With the method of covering and holding the entire cell with a stainless steel holding plate, however, it is necessary for the holding plate to have a plate thickness of about 1 mm so that the holding plate can exert spring-like properties. Consequently, it becomes difficult to reduce the weight of the holding plate and thus there is a limit on reducing the weight of the battery module. Furthermore, the battery case in Patent Literature 1 cannot apply sufficient pressing force to a battery cell that has a small expansive force when it is highly charged and thus poses a problem in that the battery case may not provide sufficient resistance to vibration to meet the required mechanical and environmental conditions.

As a result of conducting various experiments to find a condition for providing sufficient resistance to vibration, the inventors have found that even when a holding plate covers the entire cell body, i.e., the entire second main surface opposite the first main surface that is in contact with the chassis, the pressing force of the holding plate against the battery body is still distributed unevenly over the first main surface and the second main surface.

The present invention has been achieved in view of the above and an object of the present invention is to provide a lightweight battery case that can firmly secure a battery cell irrespective of the magnitude of the expansive force and that is highly resistant to vibration.

Solution to Problem

In order to solve the above problems and achieve the object, an aspect of the present invention is a battery case that accommodates therein a battery cell that has a first main surface and a second main surface opposite the first main surface. The battery case includes a chassis with which the first main surface of the battery cell comes into contact; and a holding plate that comes into partial contact with the second main surface of the battery cell and presses against the battery cell.

Advantageous Effects of Invention

According to the present invention, an effect is obtained where it is possible to provide a lightweight battery case that can firmly secure a battery irrespective of the magnitude of the expansive force and that is highly resistant to vibration.

BRIEF DESCRIPTION OF DRAWINGS

FIG. 20 is a flowchart illustrating a manufacturing process of a holding plate according to a fifth embodiment.

DESCRIPTION OF EMBODIMENTS

A battery case, a battery module, and a battery module manufacturing method according to embodiments of the present invention will be described in detail below with reference to the accompanying drawings. The embodiments are not intended to limit the present invention.

First Embodiment

Figure 1:
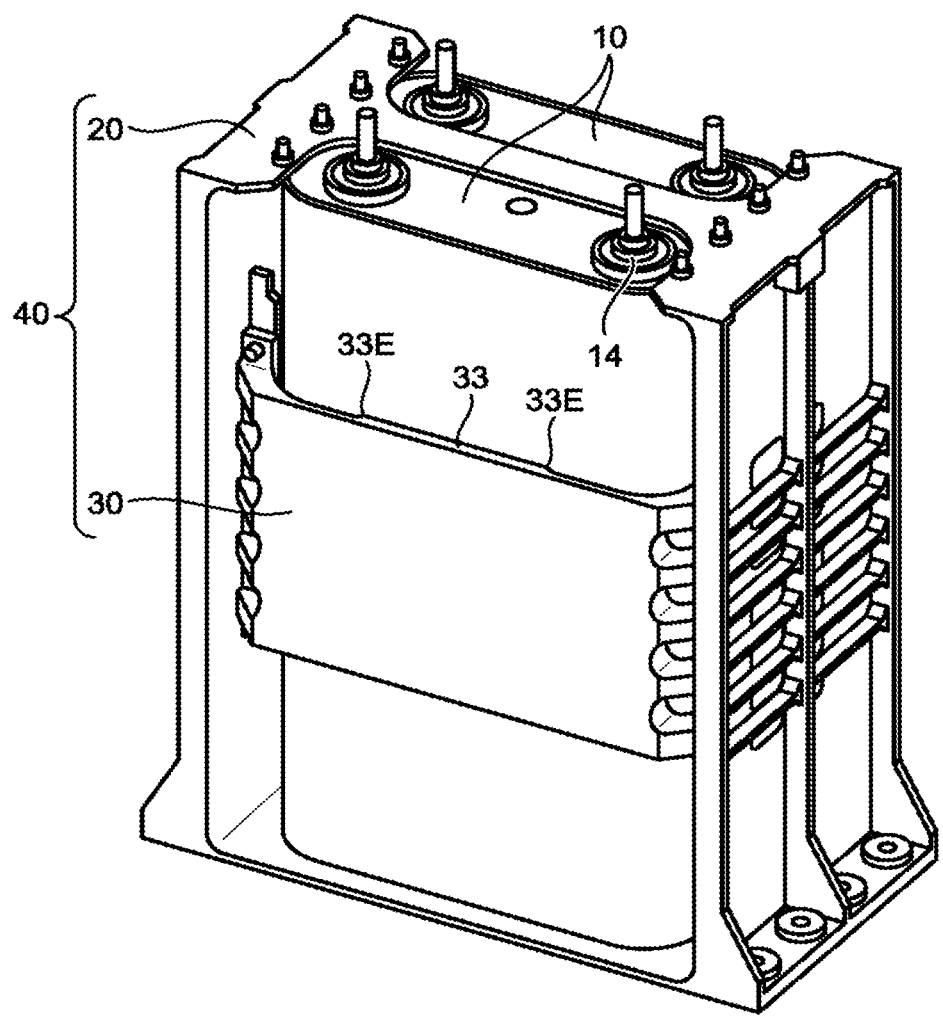
FIG. 1 is a perspective view of a battery module according to a first embodiment.
Figure 2:
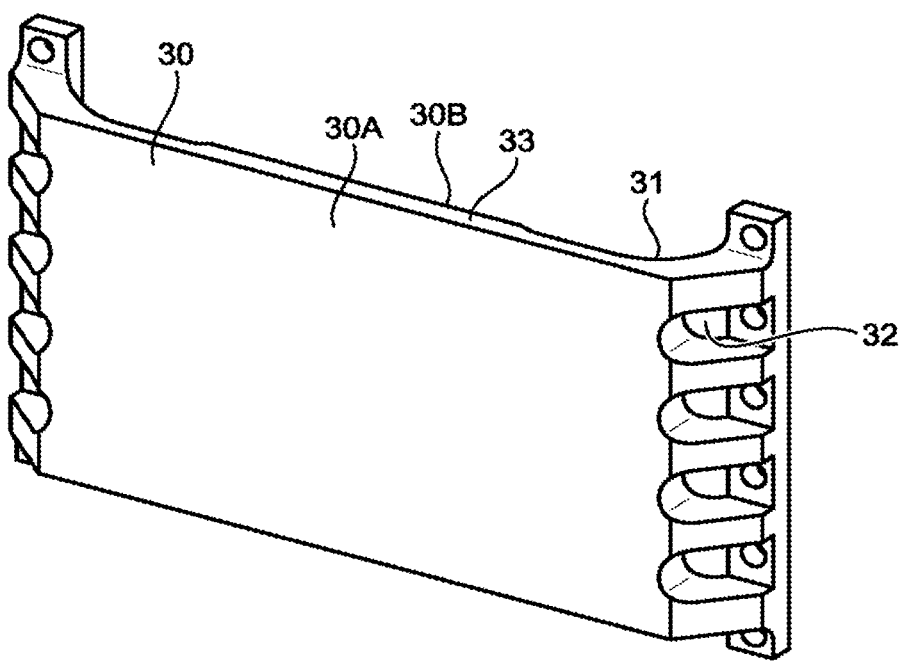
FIG. 2 is a perspective view illustrating a holding plate of the battery module according to first embodiment.
Figure 3:
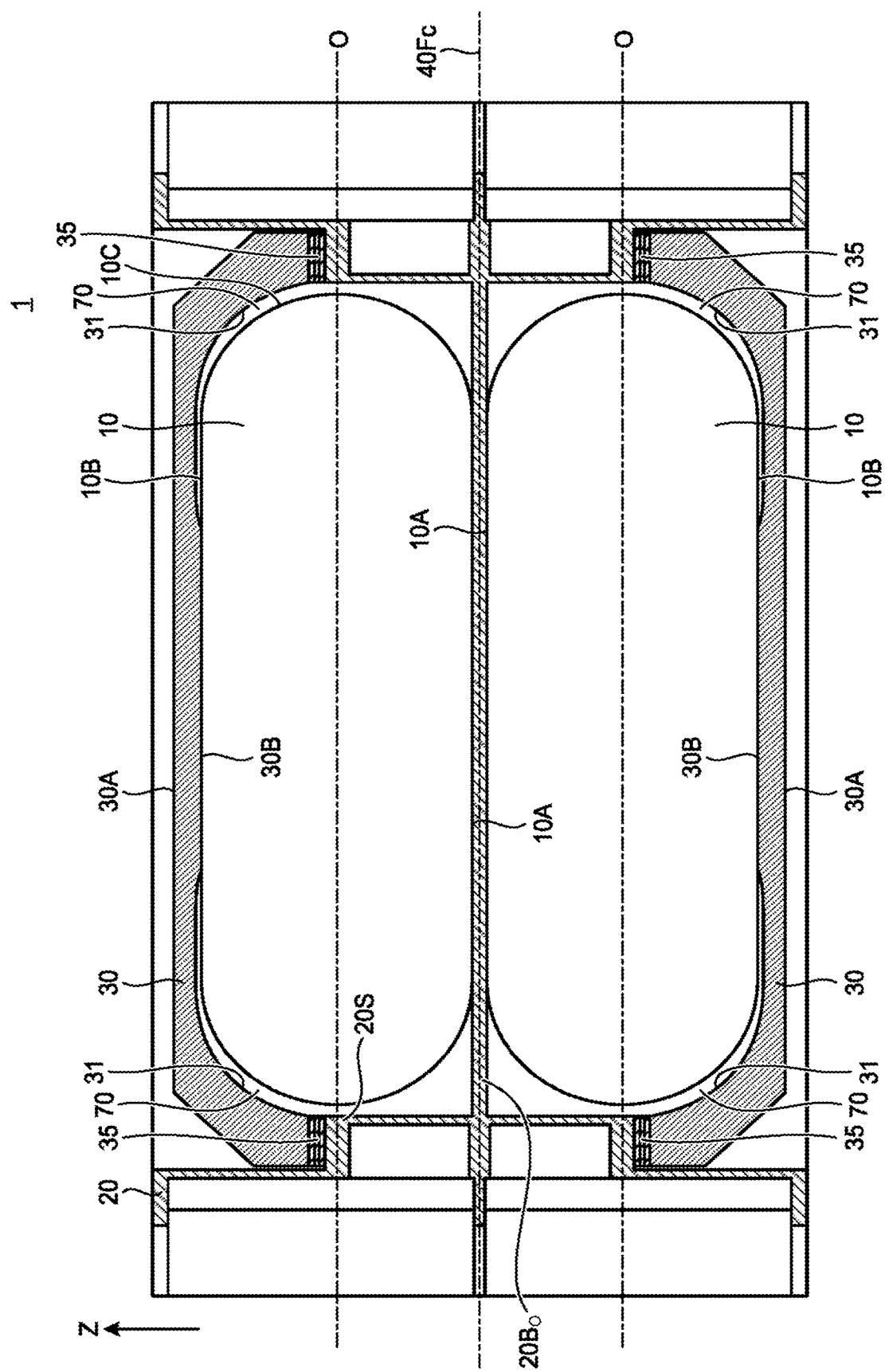
FIG. 3 is an explanatory cross-sectional view illustrating the battery module according to the first embodiment.
Figure 4:
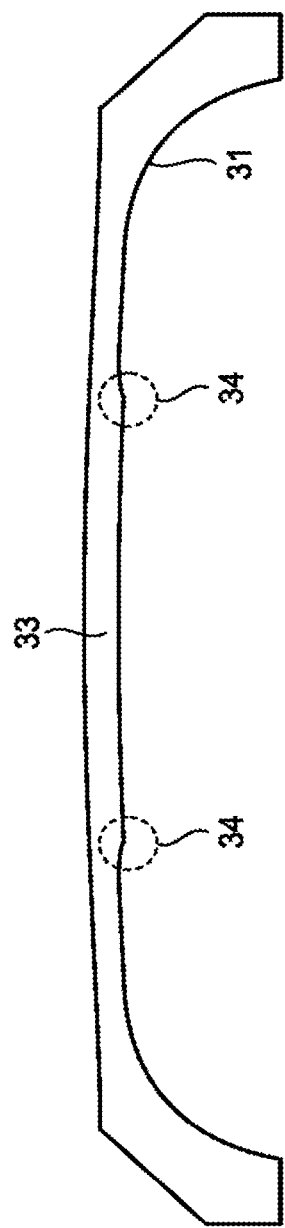
FIG. 4 is a cross-sectional view of the holding plate of the battery module according to the first embodiment.
Figure 5:
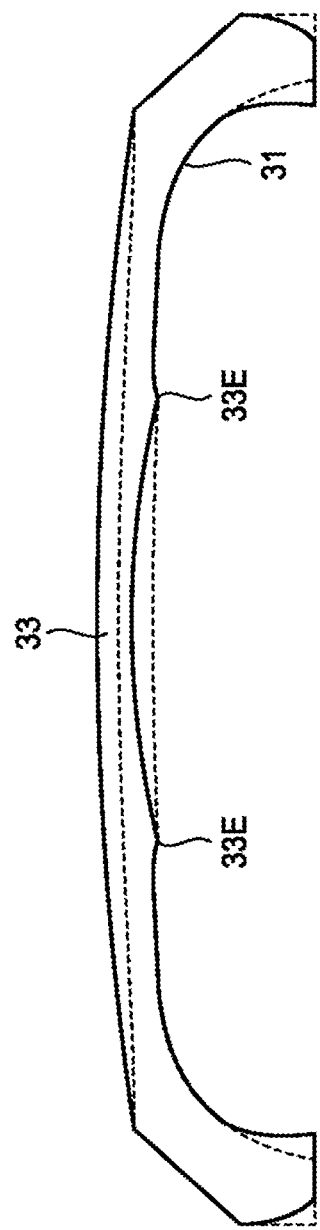
FIG. 5 is a cross-sectional view of the holding plate of the battery module according to the first embodiment.
Figure 6:
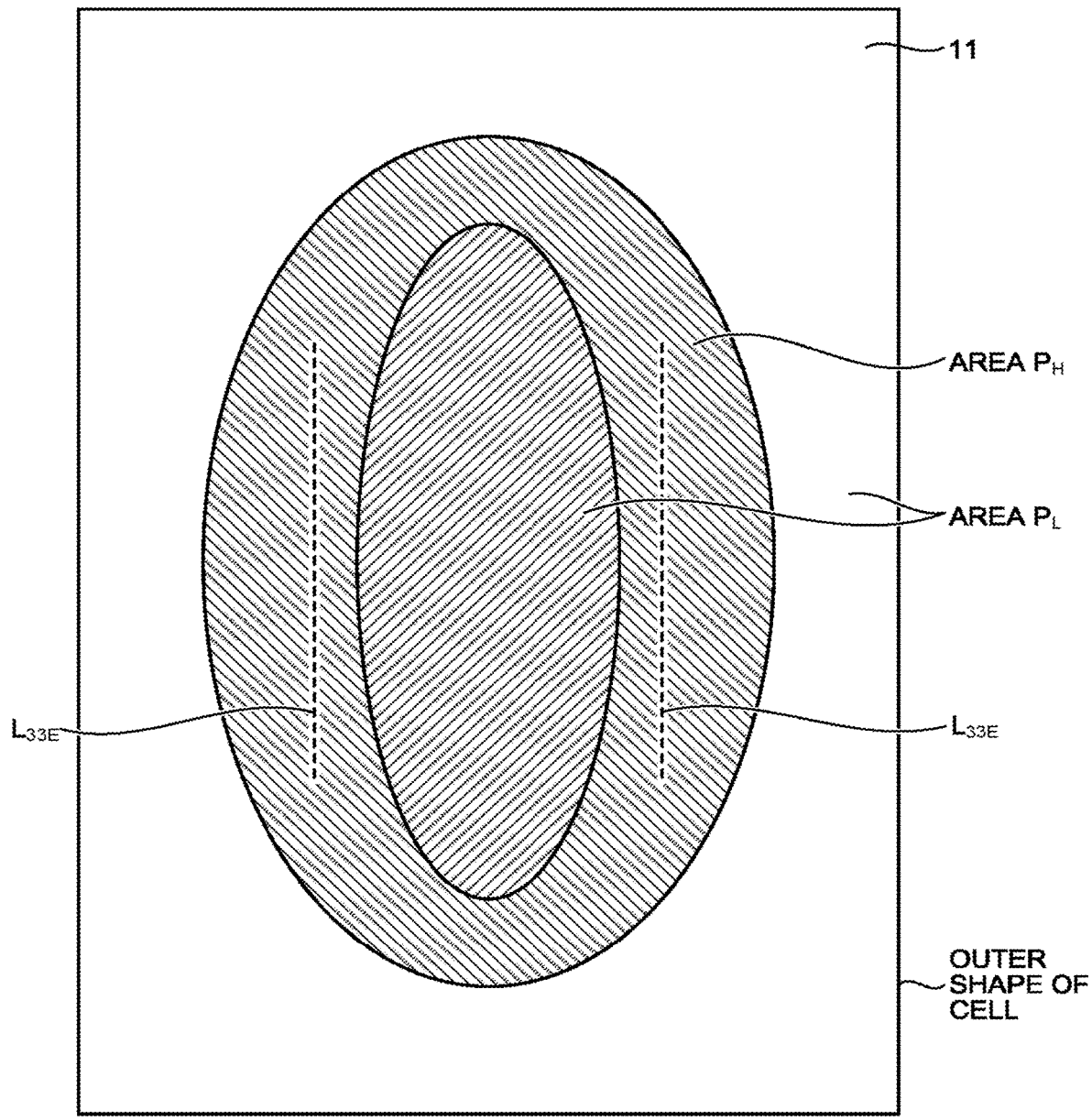
FIG. 6 is a diagram illustrating a pressure distribution over a second main surface of a battery in the battery module according to the first embodiment.
Figure 7:
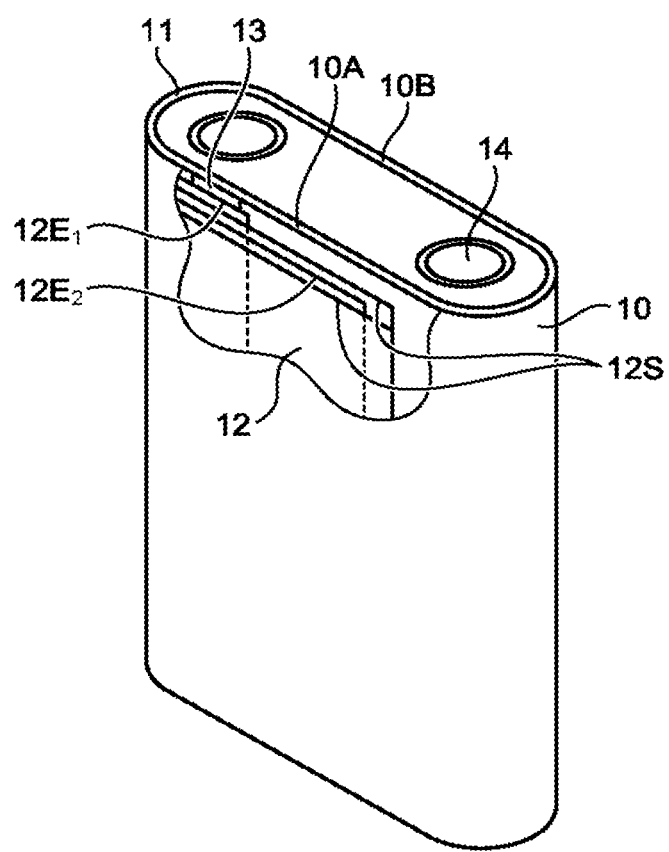
FIG. 7 is a partially cutaway perspective view illustrating a battery cell according to the first embodiment.
Figure 8:
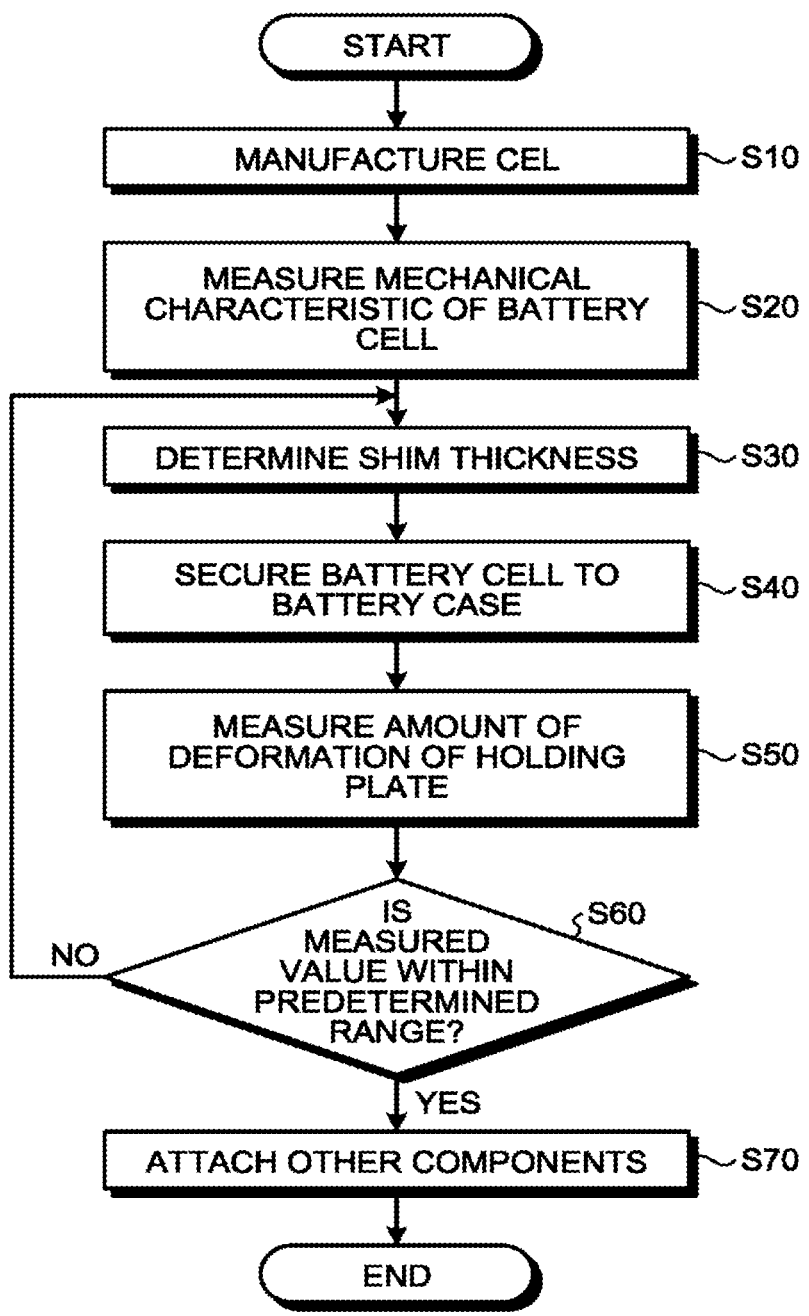
FIG. 8 is a flowchart illustrating a manufacturing process of the battery module according to the first embodiment.

FIG. 1 is a perspective view of a battery module according to a first embodiment; FIG. 2 is a perspective view illustrating a holding plate of the battery module according to first embodiment; FIG. 3 is an explanatory cross-sectional view illustrating the battery module according to the first embodiment; and FIGS. 4 and 5 are cross-sectional views of the holding plate. FIG. 6 is a diagram illustrating a pressure distribution over a second main surface of a battery in the battery module according to the first embodiment. FIG. 7 is a partially cutaway perspective view illustrating a battery cell according to the first embodiment. FIG. 8 is a flowchart illustrating a manufacturing process of the battery module. A battery module 1 in the first embodiment is the most basic configuration of a battery pack in which a required number of lithium battery cells are connected in series or in parallel. The battery module 1 includes battery cells 10 and a battery case 40 that accommodates the battery cells 10. The battery cells 10 each have an oval cross section and have a first main surface 10A and a second main surface 10B opposite the first main surface 10A. The battery case 40 in the first embodiment includes chassis 20 that come into contact with the first main surfaces 10A of the battery cells 10 and holding plates 30 that come into partial contact with the second main surfaces 10B of the battery cells 10 and press against the battery cells 10. The holding plates 30 are made of aluminum alloy, such as JIS A7075, and each include a protrusion portion 33 with a plate thickness of about 5 mm, which will be described later. The holding plate 30 is in contact with the battery cell 10 at edges 33E of step portions 34 provided at both ends of the protrusion portion 33. The battery case 40 can accommodate two battery cells 10. Because the battery cells 10 are secured such that they are symmetric with respect to a central plane 40Fc of the battery case, the forces acting on the chassis 20 when the battery cells 10 are secured by the holding plates 30 are canceled out and thus deformation of the chassis 20 is minimized.

As illustrated in FIG. 2 and FIG. 3, the holding plate 30 has an outer surface 30A and an inner surface 30B that is in contact with the second main surface 10B of the battery cell 10, and it includes, on the inner surface 30B, the protrusion portion 33 that forms a strip-like portion that covers the central portion of the second main surface 10B of the battery cell 10 in a band. The holding plate 30 further includes relief portions 31 that are formed to prevent portions other than the inner surface 30B of the holding plate 30 from coming into contact with the second main surface 10B of the battery cell 10.

FIG. 4 illustrates the holding plate 30 before it comes into contact with the battery cell 10, i.e., the holding plate 30 in its initial state. FIG. 5 illustrates the holding plate 30 that presses against the battery cell 10. The holding plate 30 includes the protrusion portion 33 in an area facing the second main surface 10B of the battery cell 10 and the relief portions 31 each located between an area facing the second main surface 10B of the battery cell 10 and an area facing a side surface 10C of the battery cell 10. The step portions 34 are formed between the protrusion portion 33 and the relief portions 31. When the holding plate 30 presses against the battery cell 10, the holding plate 30 comes into contact with an exterior casing 11 of the battery cell 10 at the edges 33E of the step portions 34.

As illustrated in FIG. 2, the holding plate 30 may have at least one opening 32 in the relief portions 31 to reduce its weight.

The holding plates 30 are secured to the chassis 20 with shims 35, which are adjustment plates, therebetween. Because the relief portions 31 are formed in the holding plate 30, a clearance 70 is formed between each of the relief portions 31 and the corresponding side surface 10C of the battery cell 10 and thus the holding plate 30 presses against the battery cell 10 without interfering with the battery cell 10. To realize the lightweight holding plate 30, it is desirable that the pressing force transmitted from the holding plate 30 to the battery cell 10 is constant irrespective of the battery cell 10 that is used. However, the thickness between the first main surface 10A and the second main surface 10B of the battery cell 10 varies within the range of the manufacturing tolerance and, in addition, the coefficient for determining the external force necessary to change the thickness of the battery cell 10, i.e., the value corresponding to the spring coefficient of the battery cell 10, also varies. In the first embodiment, to make the pressing force necessary to secure the battery cell 10 constant, the thickness of the shim 35 is adjusted in accordance with the battery cell 10 that is used. The holding plate 30, before it secures the battery cell 10, has a shape as illustrated in FIG. 4. However, the holding plate 30 that secures the battery cell 10 receives a repulsive force from the battery cell 10 and thus has a shape as illustrated in FIG. 5. The amount of deformation of the outer surface 30A of the holding plate 30 changes in accordance with the magnitude of the repulsive force exerted by the battery cell 10.

It is desirable to measure the pressure distribution when the exterior casing 11 is pressed against on the outside and to form the holding plate 30 such that it covers the area subjected to a high pressing force on the basis of the measured pressure distribution.

The inventors measured the pressure distribution of the pressure acting on the exterior casing 11 when the exterior casing 11 is pressed against on the outside by a flat plate. FIG. 6 illustrates the measurement results. The inventors found that although the flat plate uniformly makes contact with the exterior casing 11, a pressure distribution exists such that the area is divided into a high pressure area $P_H$ and a low pressure area $P_L$ and that this pressure distribution does not disappear whatever the state of charge of the battery cell 10. To determine the shape of the holding plate 30, it is desirable to measure the pressure distribution in a similar manner as above and to determine the shape of the holding plate 30 such that the inner surface 30B of the holding plate 30 comes into contact with the high pressure area $P_H$.

In FIG. 6, dashed lines $L_{33E}$ indicate the positions at which the edges 33E of the step portions 34 come into contact with the exterior casing 11 of the battery cell 10 when the holding plate 30 is pressed against the battery cell 10. By pressing the holding plate 30 against only the high pressure area according to the pressure distribution in such a manner as described above, it is possible to obtain a lightweight battery case that provides sufficient resistance to vibration and that can firmly secure batteries irrespective of the magnitude of the expansive force.

As illustrated in FIG. 7, the battery cell 10 includes the exterior casing 11; an electrode structure 12 that includes two electrode plates 12E$_1$ and 12E$_2$ in the exterior casing 11; current collector plates 13 connected to the respective electrode plates 12E$_1$ and 12E$_2$; and terminal electrodes 14 connected to the current collector plates 13. In the present embodiment, only a current collector plate and a terminal electrode having one of the polarities are illustrated and a current collector plate and a terminal electrode having the other polarity are not illustrated. The electrode structure 12 is a wound body in which two electrode plates are wound together with a separator 12S therebetween and it is immersed in an electrolytic solution (not illustrated) in the exterior casing 11. Charge generated by an electrochemical reaction in the exterior casing 11 can be extracted from the terminal electrodes 14 via the current collector plates 13.

Next, a description will be given of the battery module manufacturing method with reference to the flowchart illustrated in FIG. 8. First, battery cells are manufactured in step S10 in FIG. 8. In step S10, the battery cells 10 are made, each of which includes the exterior casing 11; the electrode structure 12 obtained by winding the two electrode plates 12E$_1$ and 12E$_2$ provided in the exterior casing 11 with the separator 12S therebetween; the current collector plates 13 connected to the respective electrode plates 12E$_1$ and 12E$_2$; and the terminal electrodes 14 connected to the current collector plates 13.

Next, the aluminum chassis 20 that each include a bottom plate 20Bo and side plates 20S provided on both sides of the bottom plate 20Bo are prepared. Then, the first main surfaces 10A of the battery cells 10 are brought into contact with the bottom plates 20Bo of the chassis 20 and thus the battery cells 10 are attached to the chassis 20.

Next, the mechanical characteristic measuring step S20 is performed to measure the mechanical characteristics of the battery cells. The battery cells 10 vary in thickness and the values that correspond to the spring coefficient; therefore, the mechanical characteristics are measured for each battery cell using a measuring device.

In the next process, i.e., the shim thickness determining step S30 of determining the shim thickness, the thicknesses of the shims 35 are determined on the basis of the values obtained in the battery-cell mechanical characteristic measuring step S20 as well as the design values or the actual measured values of the chassis 20 and the holding plates 30.

In the next process, i.e., step S40 of securing the battery cells to the battery case, the battery cells 10 are secured to the chassis 20 by securing the holding plates 30 to the chassis 20 with the shims 35 therebetween. The shims 35 have their thicknesses determined in the shim thickness determining step S30.

In the next process, i.e., the measuring step S50 of measuring the amount of deformation of the holding plates 30, measurement is made, by a measuring device such as a gauge, of the amount of deformation of the holding plates 30 in response to the repulsive force of the battery cells 10 when the holding plates 30 are secured to the chassis 20.

In the next process, i.e., the determining step S60, the amount of deformation of each of the holding plates 30 is compared with a predetermined threshold to determine whether the measured value is within a predetermined range. If the measured value is above the predetermined range, the process returns to the shim thickness determining step S30 to increase the shim thickness and then the subsequent steps are performed again. If the measured value is below the predetermined range, the process returns to the shim thickness determining step S30 to reduce the shim thickness and then the subsequent steps are performed again.

In the next process, i.e., the other-component attaching step S70, components such as electrical wires and a temperature sensor (which are not illustrated in FIG. 1) are attached.

In the above manner, the battery module 1 is manufactured.

In the battery module 1 obtained as above, the holding plate 30, which would cover the whole battery cell 10 in the conventional technology, is in contact with the battery cell 10 only in the high pressure area P$_H$ according to the pressure distribution at the edges 33E; therefore, even if the width of the holding plate 30 is reduced to ⅓, the holding plate 30 can still exert sufficient pressing force and thus the weight of the holding plate 30 can be significantly reduced.

Although the holding plates 30 are made of aluminum alloy in the present embodiment, they may be made of metal other than aluminum alloy.

Moreover, in the battery module 1 in the first embodiment, the first main surface 10A, which has the largest area, of the battery cell 10 is in full contact with the chassis 20 and the second main surface 10B of the battery cell 10 is in partial contact with the holding plate 30.

Moreover, the holding plates 30 may each form a protruding shape in advance by taking into account the deformed state of the holding plate 30 after being attached. This means that it is possible to change the pressure distribution within the contact surface of the battery cell 10 and the holding plate 30.

The shape of the holding plates 30 can be changed as appropriate to reduce the weight as long as the holding plates 30 can press against the battery cells 10 at the necessary locations. For example, the holding plates 30 can each have a hollow or a recess in the middle portion or can be constituted only by beams.

Moreover, the chassis 20 can be reduced in weight by eliminating unnecessary portions.

Moreover, although the battery cells 10 having an oval cross section are used in the first embodiment, the cross-sectional shape of the battery cells 10 can be changed as appropriate. For example, the battery cells 10 can have a rectangular cross section or a circular cross section.

Moreover, to meet the required output, it is possible to, instead of increasing or reducing the number of batteries, define one battery module 1 in the first embodiment as a basic unit and connect a plurality of battery modules 1 to form a structure.

In the first embodiment, the holding plates 30 are each an elastic body having the protrusion portion 33 to exert an inward restoring force; however, each of the holding plates 30 does not necessarily need to have a protrusion portion in the central portion and may have a plurality of protrusion portions in the peripheral portion. In other words, there is no limitation on the shape of the holding plates 30.

Figure 9:
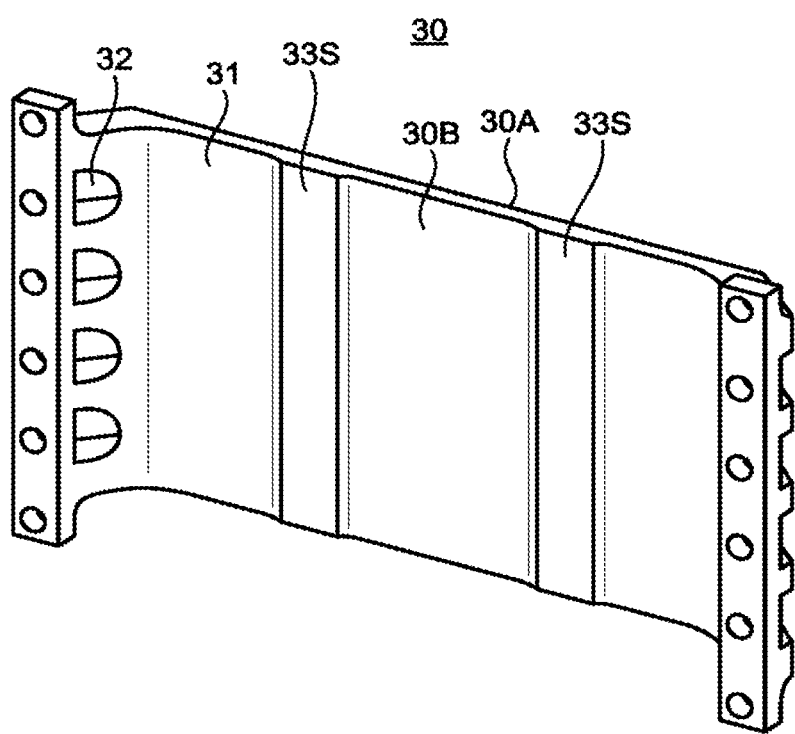
FIG. 9 is a perspective view illustrating a modification of the holding plate used in the battery case according to the first embodiment.

FIG. 9 is a perspective view illustrating a modification of the holding plate 30 used in the battery case 40 according to the first embodiment. The holding plate 30 in this modification is in contact with the battery cell 10 in two parallel linear areas on the second main surface 10B of the battery cell 10. The holding plate 30 includes two parallel linear projecting portions 33S that correspond to the two parallel linear areas in the high pressure area P$_H$ according to the pressure distribution over the battery cell 10 illustrated in FIG. 6.

The holding plate 30 is in contact with the exterior casing 11 of the battery cell 10 in the two parallel linear areas on the second main surface 10B of the battery cell 10 and the holding plate 30 holds the exterior casing 11 in the linear areas; therefore, the exterior casing 11 can be held firmly and securely. As described above, by forming the two parallel linear projecting portions 33S that are in contact with the second main surface 10B of the exterior casing 11 in the battery cell 10, the holding plate 30 can hold the battery cell 10 more firmly.

Further, in the holding plate in the first embodiment and the holding plate in the modification, the relief portions 31 may not necessarily be formed. It is sufficient if the plate body of each of the holding plates 30 exerts a restoring force directed toward the battery cell 10.

Second Embodiment

Figure 10:
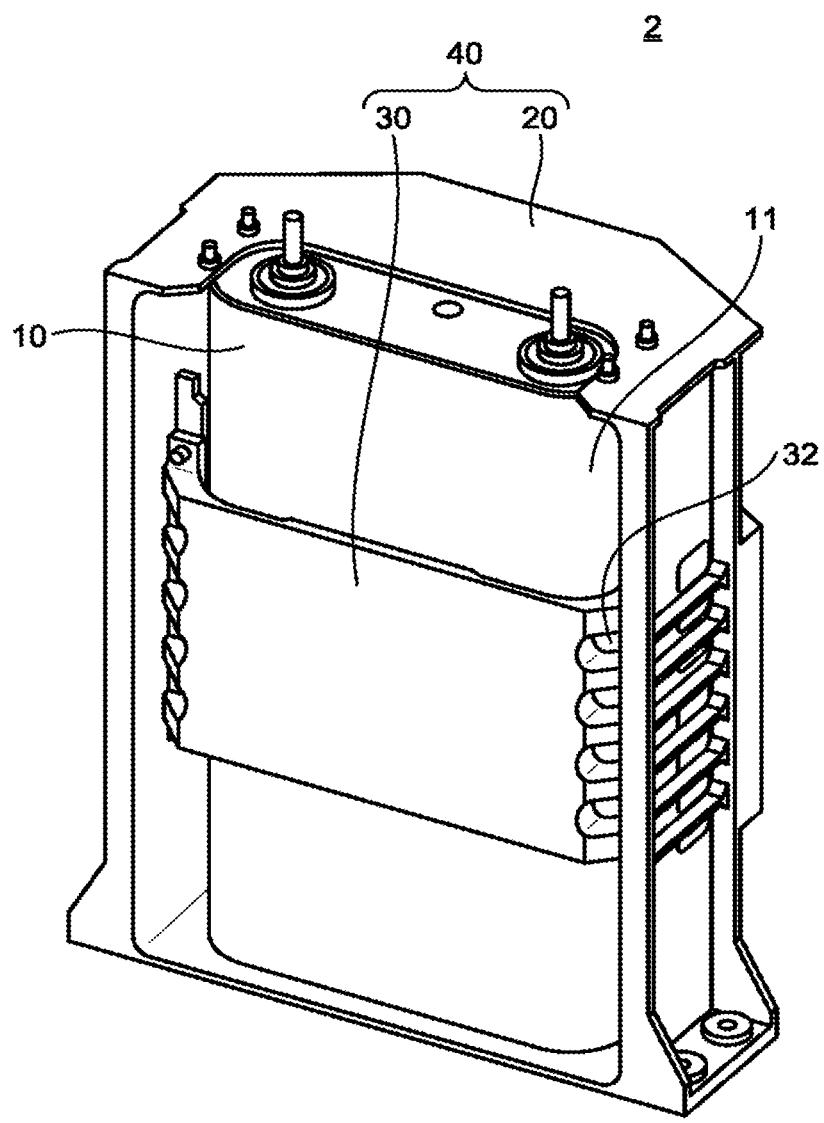
FIG. 10 is a perspective view illustrating a battery module according to a second embodiment.
Figure 11:
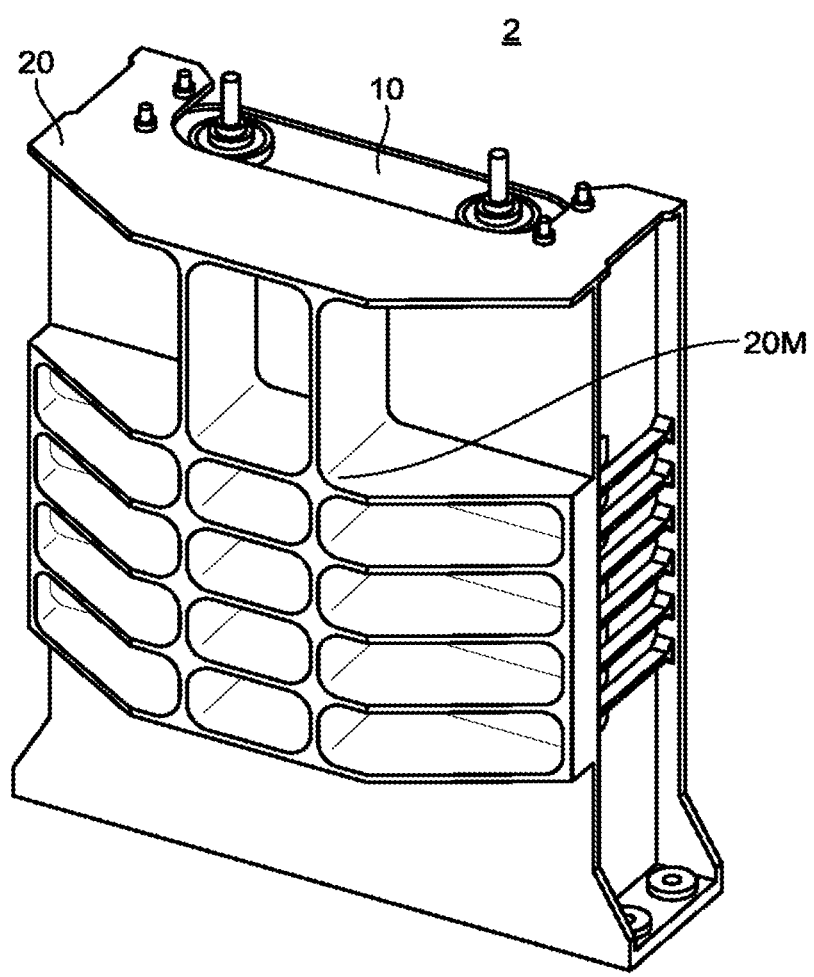
FIG. 11 is a perspective view of the battery module according to the second embodiment as seen from the back side.
Figure 12:
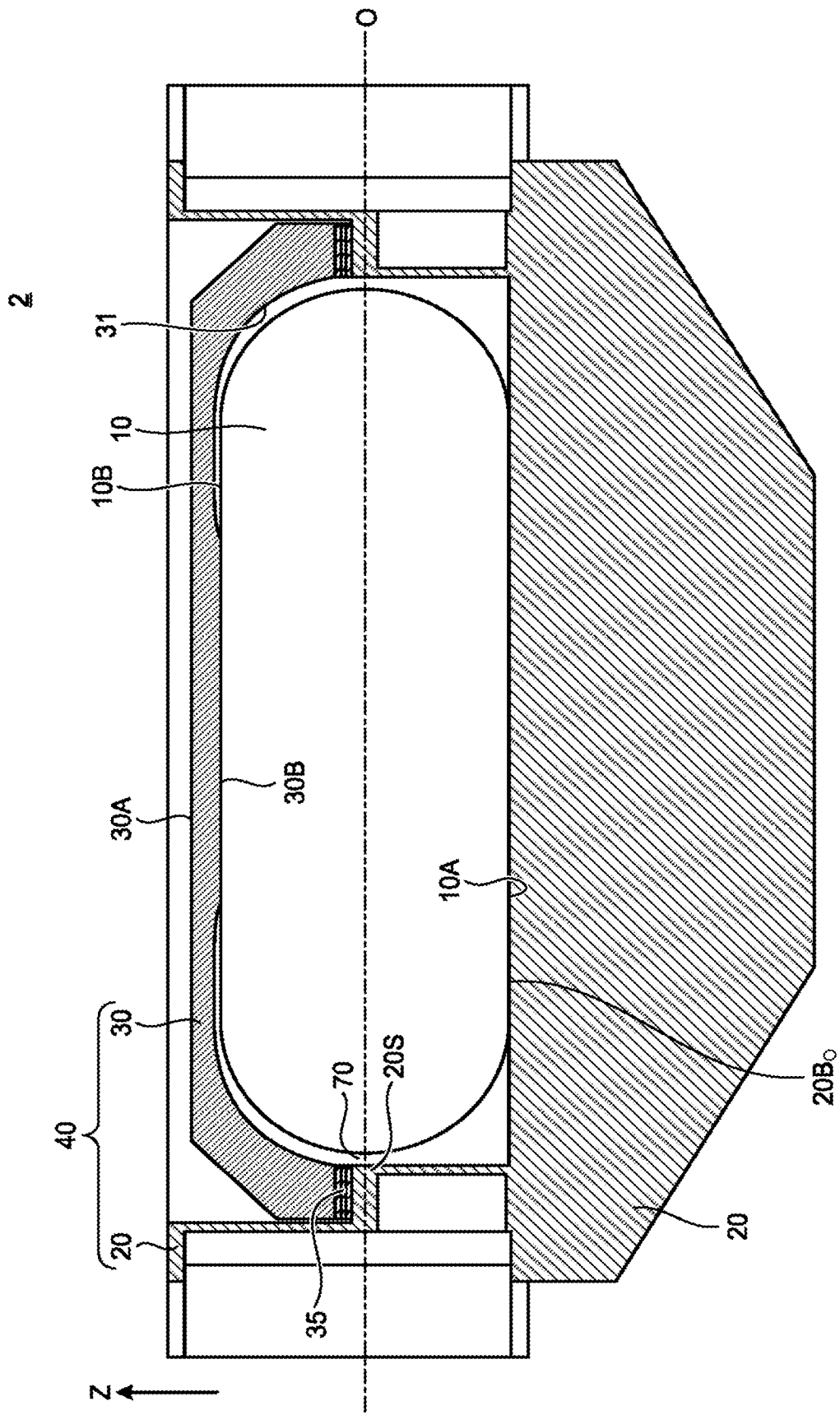
FIG. 12 is an explanatory cross-sectional view illustrating the battery module according to the second embodiment.

FIG. 10 is a perspective view illustrating a battery module according to a second embodiment of the present invention; FIG. 11 is a perspective view of the battery module according to the second embodiment as seen from the back side; and FIG. 12 is an explanatory cross-sectional view illustrating the battery module according to the second embodiment of the present invention.

A battery module 2 in the second embodiment is different from the battery module 1 in the first embodiment in that the battery case 40 accommodates only one battery cell 10. The other parts are similar to those of the battery module in the first embodiment.

Although the configuration is similar, the chassis 20 is provided with a rib-shaped reinforcing structural portion 20M as illustrated in FIG. 11 to prevent the chassis 20 from being deformed. This is because when the battery cell 10 is secured by the holding plate 30, the force acting on the chassis 20 may deform the chassis 20. The rib-shaped reinforcing structural portion 20M is formed such that a weight increase of the chassis 20 is prevented while minimizing deformation of the chassis 20.

The aluminum chassis 20 that accommodates the battery cell 10 includes the bottom plate 20Bo and the side plates 20S provided on both sides of the bottom plate 20Bo. The chassis 20 is provided with the reinforcing structural portion 20M on the back side. The reinforcing structural portion 20M has projections and recesses in order to realize a reduction in weight and an increase in strength.

When the holding plate 30 presses against the exterior casing 11, small protrusions and recesses appear on the outer surface of the exterior casing 11 and thus only the protrusions are pressed against. For this reason, it is desirable to measure the pressure distribution when the exterior casing 11 is pressed against on the outside and to form the holding plate 30 such that it covers the area subjected to a high pressing force on the basis of the measured pressure distribution.

In the battery module in the first embodiment, two battery cells are secured such that they are symmetric with respect to the central plane 40Fc of the battery case, thereby causing the forces acting on the chassis 20 when the battery cells 10 are secured by the holding plates 30 to be canceled out. Thus, deformation of the chassis 20 can be minimized. In contrast, when only one battery cell 10 is secured by the holding plate 30, the chassis 20 may be deformed and thus it may become difficult to hold the battery cell 10 with the desired holding force.

With the battery module according to the second embodiment, even when only one battery cell 10 is secured by the holding plate 30, the rib-shaped reinforcing structural portion 20M can minimize the deformation of the chassis 20 and thus the holding plate 30 can keep holding the battery cell 10.

The battery cell 10 has protrusions and recesses in some cases in areas corresponding to the positions of the end portions of the electrode plates $12E_1$ and $12E_2$. In such a case, the holding plate 30 is provided such that it covers the outer surface of the exterior casing 11 in the areas corresponding to the positions of the end portions of the electrode plates $12E_1$ and $12E_2$ of the battery cell 10. The holding plate 30 covers at least part of the wound ends of the electrode plates $12E_1$ and $12E_2$. Moreover, if protrusions and recesses appear on the outer surface of the exterior casing 11 when the holding plate 30 presses against the exterior casing 11, the holding plate 30 may be provided at a position corresponding to the protrusions of the battery cell 10.

In such a case, the holding plate 30 can be designed without the need to measure the pressure distribution over the second main surface of the battery cell 10 as illustrated in FIG. 6.

Also in the case where two battery cells are accommodated as in the first embodiment, if the battery cells 10 have protrusions and recesses in areas corresponding to the positions of the end portions of the electrode plates $12E_1$ and $12E_2$ and if protrusions and recesses appear on the outer surfaces of the exterior casings 11 when the holding plates 30 press against the exterior casings 11, the holding plates 30 may be provided such that they cover the outer surfaces of the exterior casings 11 in the areas corresponding to the positions of the end portions of the electrode plates $12E_1$ and $12E_2$ of the battery cells 10.

In the battery module in the first and second embodiments, the holding plate presses against only a high pressure portion of the battery cell 10 at the edges 33E in accordance with the results of measurement of the pressure distribution over the second main surface of the battery cell 10; however, as described above, if it is apparent that the second main surface 10B of the battery cell 10 has protrusions and recesses, the holding plate may be configured to press against the protrusions.

Third Embodiment

Figure 13:
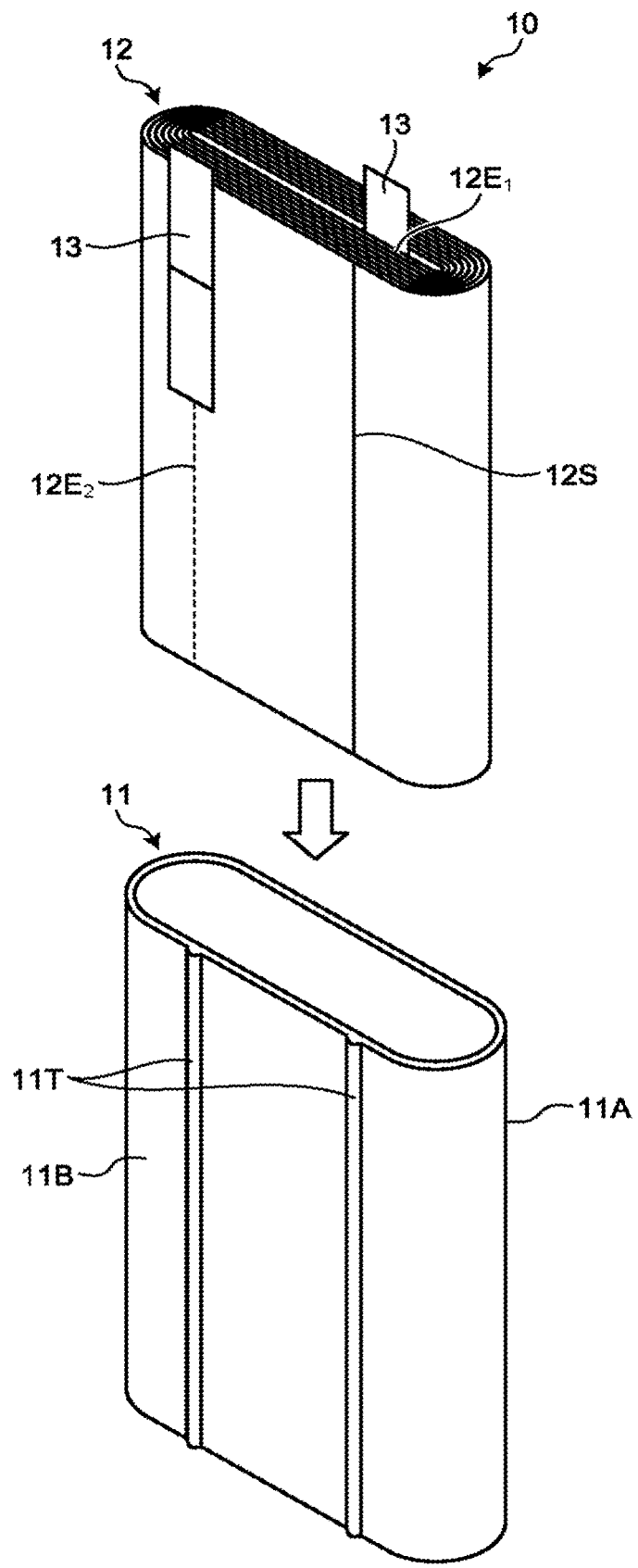
FIG. 13 is an exploded perspective view illustrating a battery cell of a battery module according to a third embodiment.
Figure 14:
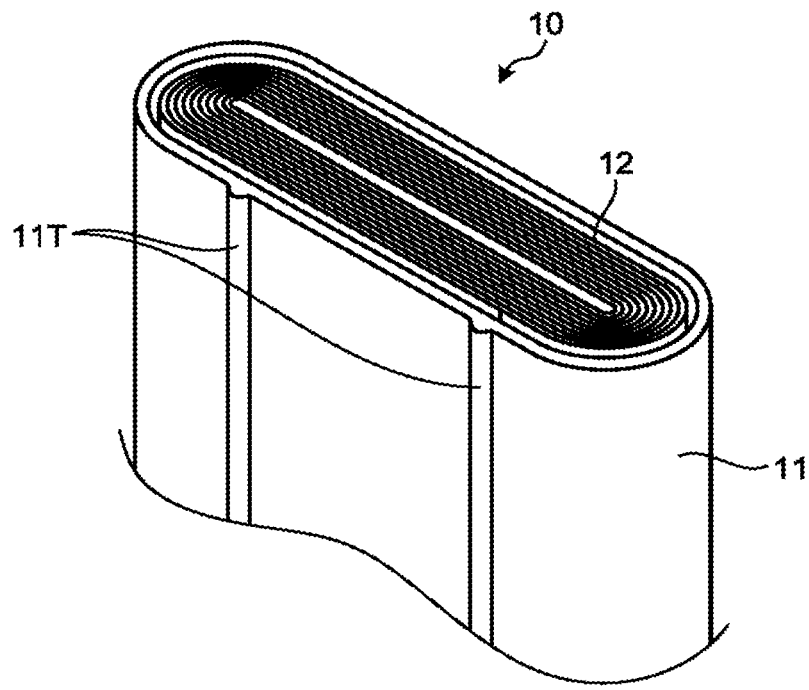
FIG. 14 is a partial perspective view illustrating the battery cell according to the third embodiment.
Figure 15:
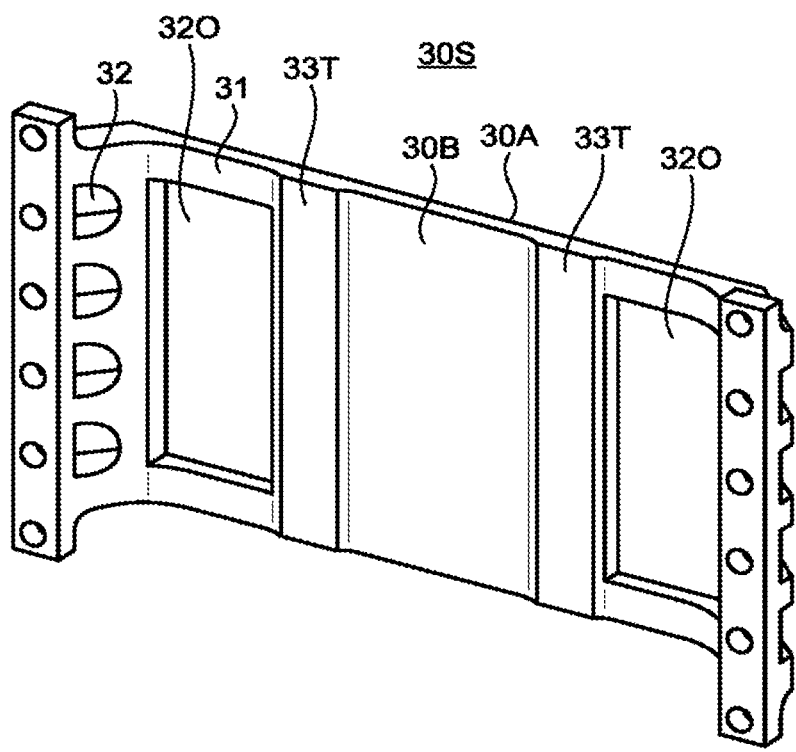
FIG. 15 is a perspective view illustrating a holding plate of the battery module according to the third embodiment.
Figure 16:
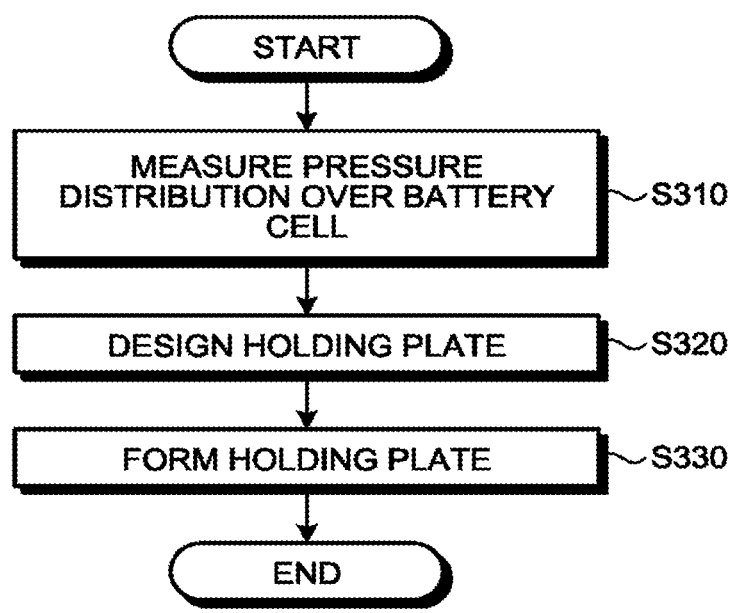
FIG. 16 is a flowchart illustrating a manufacturing process of the holding plate used in the battery module according to the third embodiment.

FIG. 13 is an exploded perspective view illustrating a battery cell of a battery module according to a third embodiment; FIG. 14 is a partial perspective view illustrating the battery cell according to the third embodiment; and FIG. 15 is a perspective view illustrating a holding plate of the battery module according to the third embodiment. FIG. 16 is a flowchart illustrating a manufacturing process of the holding plate. The battery cell 10 that is a battery in the third embodiment includes the exterior casing 11; the two electrode plates 12E1 and 12E2 constituted by a positive electrode plate and a negative electrode plate provided in the exterior casing 11; the current collector plates 13 connected to the electrode plates 12E1 and 12E2; and terminal electrodes (not illustrated) connected to the current collector plates 13. The exterior casing 11 has first and second main surfaces 11A and 11B opposing each other and includes protruding portions 11T on the outer side of the second main surface 11B. The protruding portions 11T cover the area corresponding to the positions of the end portions of the current collector plates 13 of the battery cell 10.

The battery cell 10 is a wound cell in which the two electrode plates $12E_1$ and $12E_2$ constituted by a positive electrode plate and a negative electrode plate are wound together with the separator 12S therebetween.

The battery cell 10 includes the protruding portions 11T on the outer surface; therefore, high pressure is applied to the protruding portions 11T when a holding plate 30S presses against the battery cell 10. Because protrusion portions 33T of the holding plate 30S press against only the protruding portions 11T, the battery cell 10 can be firmly secured to the chassis 20 of the battery case 40. As illustrated in FIG. 15, the holding plate 30S includes the protrusion portions 33T, which correspond to the protruding portions 11T of the exterior casing of the battery cell 10. Thus, the holding plate 30S can firmly secure the battery cell 10 to the chassis 20.

The holding plate 30S has openings 32O each having an area larger than the opening 32 in the battery module 1 in the first embodiment; therefore, the holding plate 30S can not only secure the battery cell 10 firmly but also have its weight further reduced.

When the holding plate used in the battery module according to the third embodiment is manufactured, the following method as illustrated in the flowchart of the holding-plate manufacturing process in FIG. 16 is used. Before the holding plate 30S is designed, first, in step S310, the first main surface 10A of the battery cell 10 is brought into contact with the chassis 20 and the battery cell 10 is pressed against on the second main surface 11B of the exterior casing 11 by an inspection plate so as to measure the pressure distribution over the inspection plate.

Next, in step S320, the holding plate is designed in accordance with the pressure distribution such that the holding plate presses against only an area subjected to a higher pressing force than a certain value. In step S320, the holding plate is designed in accordance with the pressure distribution measured in step S310 such that the holding plate includes pressing portions that press against only an area subjected to a higher pressing force than a certain value. The shape of the holding plate is determined while taking into account the strength thereof as well.

In step S330, the holding plate 30S illustrated in FIG. 15 is formed in accordance with the design data obtained in the designing step described above. Then, the holding plate 30S is attached to the battery cell 10 secured to the chassis 20.

Fourth Embodiment

Figure 17:
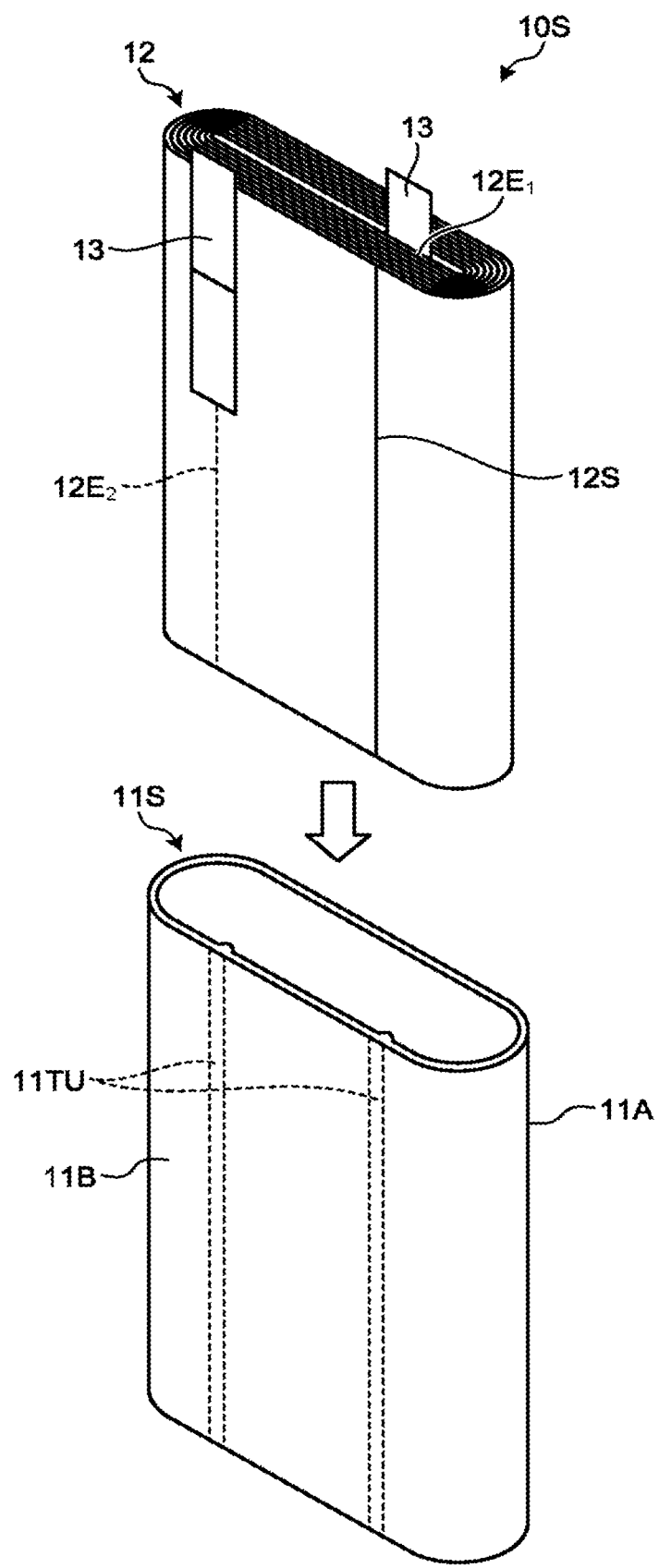
FIG. 17 is an exploded perspective view illustrating a battery cell of a battery module according to a fourth embodiment.
Figure 18:
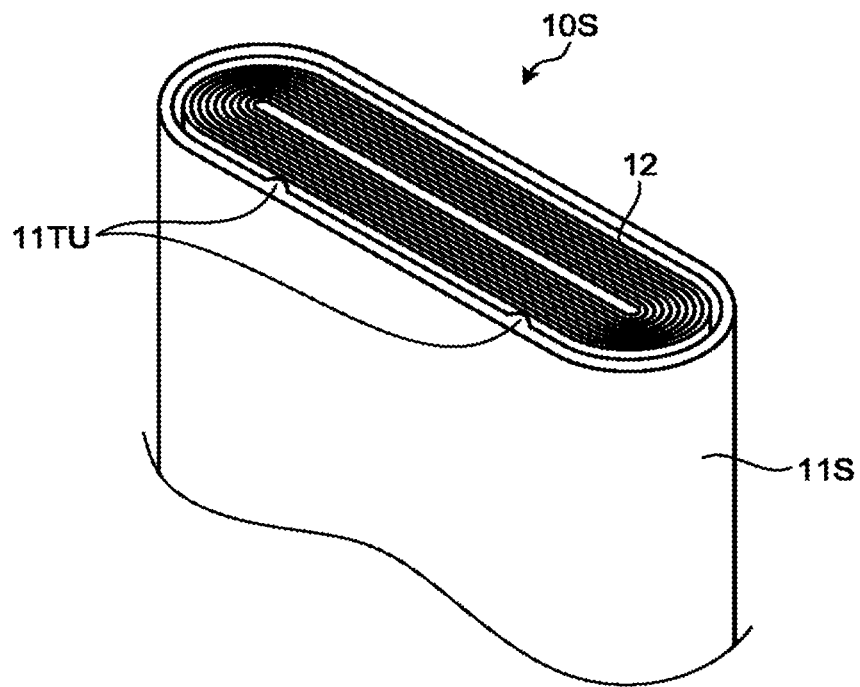
FIG. 18 is a partial perspective view illustrating the battery cell according to the fourth embodiment.
Figure 19:
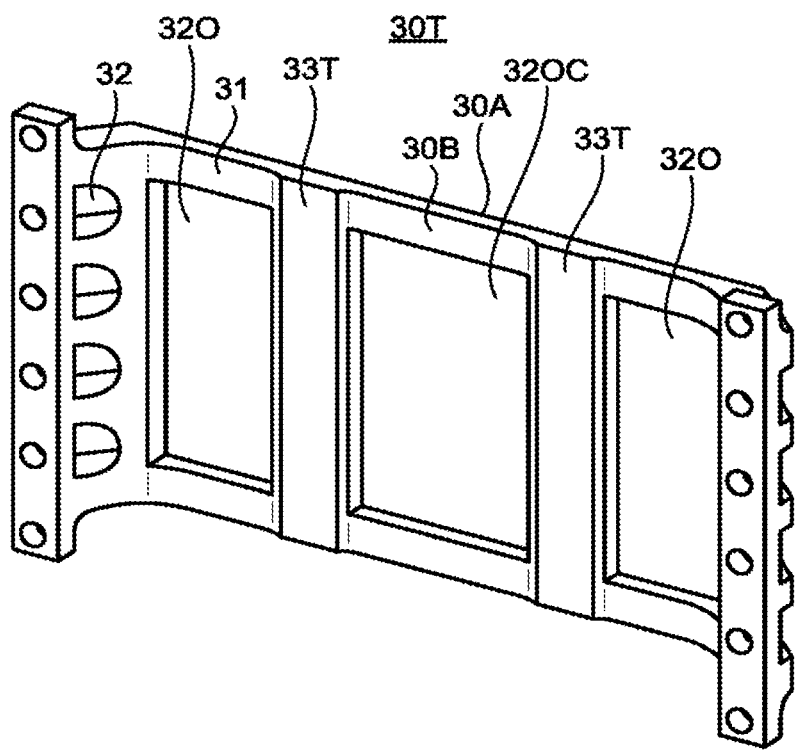
FIG. 19 is a perspective view illustrating a holding plate of the battery module according to the fourth embodiment.

FIG. 17 is an exploded perspective view illustrating a battery cell of a battery module according to a fourth embodiment; FIG. 18 is a partial perspective view illustrating the battery cell according to the fourth embodiment; and FIG. 19 is a perspective view illustrating a holding plate of the battery module according to the fourth embodiment. The battery cell 10 in the third embodiment is provided with the protruding portions 11T on the outer surface of the exterior casing 11; while in contrast to the third embodiment, a battery cell 10S that is a battery in the fourth embodiment is provided with protruding portions 11TU on the inner surface of an exterior casing 11S. The other parts are similar to those of the battery cell 10 in the third embodiment; therefore, descriptions thereof are omitted. The same components are designated by the same reference numerals.

The exterior casing 11S of the battery cell 10S in the fourth embodiment has the first and second main surfaces 11A and 11B opposite each other and includes the protruding portions 11T on the inner side of the second main surface 11B.

The battery cell 10S includes the protruding portions 11TU on the inner surface; therefore, high pressure is applied to the protruding portions 11TU when a holding plate 30T presses against the battery cell 10S. Thus, the protrusion portions 33T of the holding plate 30T press against only the protruding portions 11TU, and the battery cell 10S can be firmly secured to the chassis 20 of the battery case 40. As illustrated in FIG. 19, the holding plate 30T includes the protrusion portions 33T, which correspond to the protruding portions 11U of the exterior casing of the battery cell 10S. Thus, the holding plate 30T can firmly secure the battery cell 10S to the chassis 20.

The holding plate 30T has an opening 32OC having an area larger than the opening 32O in the battery module in the third embodiment; therefore, the holding plate 30T can not only secure the battery cell 10S firmly but also have its weight further reduced.

Fifth Embodiment

FIG. 20 is a flowchart illustrating a manufacturing process of a holding plate that is part of a manufacturing method of a battery module according to a fifth embodiment. The fifth embodiment has a characteristic in that the holding plate is designed in accordance with the pressure distribution over the battery cell. The battery cell 10 is similar to that in the first embodiment and may not necessarily include protruding portions on the exterior casing. Although not illustrated, the fifth embodiment will be described with reference to the manufacturing process of the battery module 1 according to the first embodiment. First, battery cells are manufactured in step S510. In step S510, the battery cells 10 are made, each of which is a lithium battery cell that includes the exterior casing 11; the electrode structure 12 obtained by winding together the two electrode plates $12E_1$ and $12E_2$ provided in the exterior casing 11 with the separator 12S therebetween; the current collector plates 13 connected to the respective electrode plates $12E_1$ and $12E_2$; and the terminal electrodes 14 connected to the current collector plates 13.

Next, in step S520, the aluminum chassis 20 that each include the bottom plate 20Bo and the side plates 20S provided on both sides of the bottom plate 20Bo are prepared. Then, the first main surfaces 10A of the battery cells 10 are brought into contact with the bottom plates 20Bo of the chassis 20 and thus the battery cells 10 are attached to the chassis 20.

Then, in step S530, each of the battery cells 10 is pressed against on the second main surface of the exterior casing 11 by an inspection plate (not illustrated) so as to measure the pressure distribution.

In step S540, the holding plates 30 are each designed such that it covers the central portion of the exterior casing 11 subjected to high pressure according to the pressure distribution, whereby the holding plates 30 are formed.

The holding plates 30 formed according to the determined design are attached to the second main surfaces 10B of the battery cells 10.

The holding plates 30 are arranged on the second main surfaces 10B of the battery cells 10 such that the holding plates 30 each cover part of the second main surface 10B of the battery cell 10. Then, in step S40, the holding plates 30 are each secured to the chassis 20 at a position above a center O between the first main surface 10A and the second main surface 10B of the battery cell 10 such that the clearances 70 are formed between the holding plate 30 and the battery cell 10.

The battery module 1 is manufactured as described above. After the holding plates 30 are designed and formed in step S540, the battery module 1 is assembled in accordance with the flowchart illustrated in FIG. 8 in the first embodiment, whereby the battery module having a high holding property can be obtained.

In the battery cells in the third and fourth embodiments, protruding portions are formed such that they cover at least part of the area corresponding to the positions of the end portions of the electrode plates of the battery cell. However, the protruding portions may be formed over the entire area of the end portions of the electrode plates. Alternatively, the protruding portions may be provided in an area other than the positions of the end portions of the electrode plates of the battery cell. The shape of the holding plate can be appropriately selected by not restricting the positions of the protruding portions in design.

Moreover, the shape of the holding plate may be determined while taking into account the strength thereof. When the shape of the holding plate is determined, protruding portions may be formed on the outer surface or the inner surface of the exterior casing of the battery cell in accordance with the shape of the holding plate to intentionally form an area that is subjected to a high pressing force.

Further, although the battery cell described above has a wound-electrode structure formed by winding electrode plates together, it is obvious that the battery cell may have a stacked-electrode structure in which a positive electrode plate and a negative electrode plate are alternately stacked with a separator therebetween. When a stacked-electrode structure is used, a step is likely to be formed at the end portions of the electrode plates. Thus, it is desirable to use a holding plate that covers the peripheries of the electrode plates.

The configurations described in the foregoing embodiments are merely examples of various aspects of the present invention. These configurations may be combined with any other known technology, and moreover, part of such configurations may be omitted or modified without departing from the scope of the present invention.

REFERENCE SIGNS LIST 1, 2 battery module; 10, 10S battery cell; 10A first main surface; 10B second main surface; 11 exterior casing; 11A first main surface of exterior casing; 11B second main surface of exterior casing; 11T, 11TU protruding portion; 12 electrode structure; $12E_1$, $12E_2$ electrode plate; 12S separator; 13 current collector plate; 14 terminal electrode; 20 chassis; 20Bo bottom plate; 20S side plate; 20M reinforcing structural portion; 30, 30S, 30T holding plate; 31 relief portion; 32, 32O, 32OC opening; 33, 33T protrusion portion; 35 shim; 40 battery case; 40Fc central plane of battery case; 70 clearance.

The invention claimed is:

1. A battery case that accommodates therein a battery cell that has a first main surface and a second main surface opposite the first main surface, the battery case comprising:
a chassis with which the first main surface of the battery cell comes into contact; and
a holding plate that includes:
a strip-like portion that covers a central portion of the second main surface of the battery cell in a band, in an area facing the second main surface of the battery cell;
a relief portion on a surface between the second main surface and a side surface of the battery cell, the relief portion being configured such that the holding plate does not make contact at the relief portion; and
a step portion between the strip-like portion and the relief portion such that the relief portion is formed from the step portion toward an area facing the side surface of the battery cell, wherein
when the holding plate presses against the battery cell, the holding plate comes into contact with the second main surface of the battery cell at an edge of the step portion.

2. The battery case according to claim 1, wherein the holding plate has an opening in the surface between the second main surface and the side surface of the battery cell.

3. The battery case according to claim 1, wherein a contact portion of the holding plate and an exterior casing of the battery cell includes two parallel linear areas on the second main surface of the battery cell.

4. The battery case according to claim 3, wherein the holding plate includes, on the contact portion with the exterior casing of the battery cell, two linear projecting portions that are parallel on the second main surface of the battery cell.

5. A battery module comprising:
the battery case according to claim 1; and
the battery cell having the first main surface and the second main surface, the first main surface being in contact with the chassis, the second main surface being opposite the first main surface and being in contact the holding plate.

6. The battery module according to claim 5, wherein
two chassis are integrally formed such that a side of each of the chassis, on which the battery cell is installed, faces outward, and
battery cells are attached to the chassis such that the first main surfaces of the battery cells are parallel to each other.

7. The battery case according to claim 1, wherein the relief portion is formed so that only an area surrounded by two parallel linear portions formed in the holding plate comes into contact with the second main surface of the battery cell.

8. The battery case according to claim 7, wherein the holding plate has an opening in the surface between the second main surface and the side surface of the battery cell.

9. The battery case according to claim 1, wherein the projecting portions are formed to correspond to an area subjected to higher pressure according to a pressure distribution over a surface of the battery cell that is measured by pressing against the exterior casing of the battery cell.

10. The battery case according to claim 1, wherein the relief portion of the holding plate is formed to follow a shape of the battery cell.

11. The battery case according to claim 10, wherein the relief portion of the holding plate is formed such that the holding plate does not make contact with the battery cell at the relief portion even when the shape of the battery cell changes due to expansion and contraction of the battery cell.

12. The battery case according to claim 1, wherein a position at which the edge of the step portion comes into contact with the second main surface of the battery cell corresponds to an area subjected to high pressure according to a pressure distribution.

* * * * *